May 3, 1927.
F. H. ZUEHLKE
1,627,002
HARROW
Filed July 20, 1925
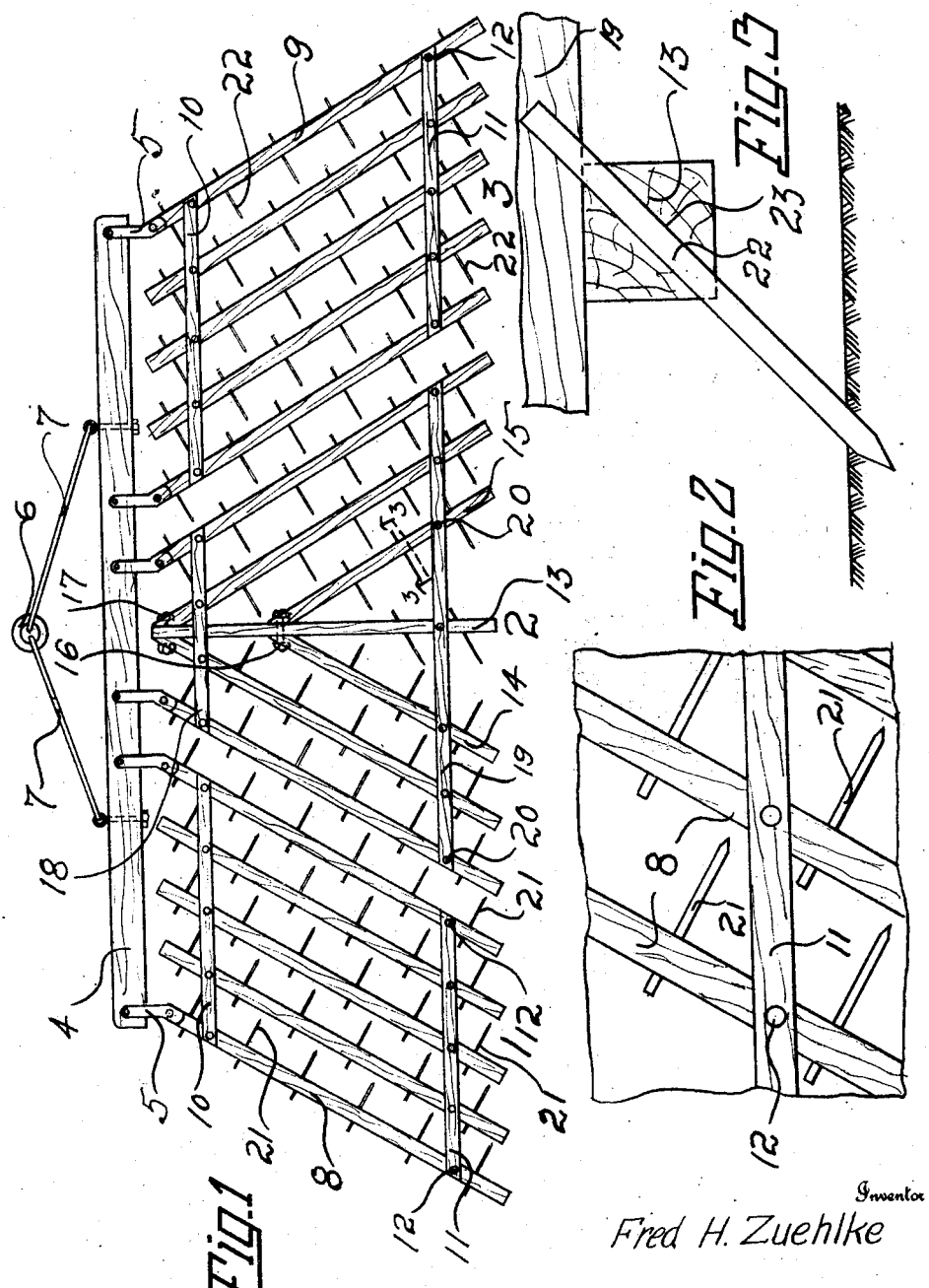
Inventor
Fred H. Zuehlke
By Herbert E. Smith
Attorney Patented May 3, 1927.

1,627,002

UNITED STATES PATENT OFFICE.

FRED H. ZUEHLKE, OF DAVENPORT, WASHINGTON.

HARROW.

Application filed July 20, 1925. Serial No. 44,718.

My present invention relates to improvements in harrows of the self-cleaning drag type, especially adapted for the purpose of mulching or cultivating the soil and eliminating weeds therefrom.

The invention contemplates the use of a plurality of flexible frame sections having diagonally or angularly extending tooth bars upon which are carried fixed teeth or spikes arranged in angular relation to the direction of forward movement of the harrow as it is dragged over the surface of the soil.

By this arrangement of parts of the harrow the teeth are able to automatically free themselves from weeds or trash and are thus self-cleaning. The teeth, because of this arrangement are also disposed in such manner as to thoroughly mulch the soil over a comparatively wide area as the harrow advances in its work.

The invention consists in certain novel combinations and arrangements of the teeth and tooth bars as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a plan view of a harrow embodying my invention.

Figure 2 is an enlarged detail top plan view of a portion of the harrow.

Figure 3 is a further enlarged detail sectional view as at line 3—3 showing one of the tooth bars and a tooth or spike therein.

In carrying out my invention I preferably utilize a plurality of sections as 1, 2 and 3, which are flexibly connected to a transverse draft bar 4 by means of pivoted links 5 that preferably connect the two outer edges of each frame section with the draft bar in order that the power may be applied uniformly and be properly distributed. The horse power or mechanical power for dragging the harrow is applied in usual manner through the ring 6 and links 7, the latter being flexibly connected to the forward side of the draft bar in usual manner.

It will be noted that the outer or side frames 1 and 3 are each provided with a series of angularly disposed parallel tooth bars as 8 and 9 which converge toward the front of the harrow or the point to which the draft power is applied, and each series of angular bars is connected by transverse brace bars 10 and 11 at the front and rear. Bolts 12 are passed through the upper brace bars and the two series of obliquely disposed tooth bars to provide rigid frame sections, and the bars of each series are retained in rigid parallelism with the obliquely arranged bars of each series on converging lines.

The intermediate section 2 is preferably fashioned with a central longitudinal bar 13, and two series of converging oppositely disposed or obliquely arranged bars 14 and 15 are employed at the sides of the central bar to make up the frame. The two inner pairs of converging bars 14 and 15 are bolted rigidly at their forward ends to the central bar 13, as at 16 and 17, and both series of converging bars are joined together by means of a front cross bar 18 and a rear cross bar 19. By means of bolts 20 the upper cross bars or braces at the front and rear of the harrow are secured to the two series of lower obliquely arranged tooth bars to form a rigid and well braced intermediate section of the harrow.

Two sets of angularly disposed, staggered teeth or spikes 21 and 22 are carried by the three sections of the harrow frame, one set at each side of the longitudinal center of the implement, and as seen in Figure 1 the sets of teeth are disposed obliquely in opposite directions pointing inwardly toward the longitudinal center of the implement and partly to the rear.

The teeth are carried in sockets 23 in the tooth bars as seen in Figure 3 and the teeth or spikes may be secured in the tooth bars in usual manner.

The teeth of the two oppositely disposed series are thus set in the bars obliquely to the forward direction of travel of the harrow, at right angles to the longitudinal center of a tooth bar, and downwardly inclined from the transverse or horizontal axis of the bar.

As thus arranged the teeth are in staggered formation and designed to cover an extended area for cultivating the soil as the implement is dragged over its surface.

Thus it will be apparent that as the implement is drawn over the ground, the oppositely disposed, obliquely arranged sets of teeth pass through the soil to thoroughly mulch or cultivate it, and weeds, trash and other débris are prevented from accumulating on the teeth because of their obliquely disposed positions. Also because of the flexible connections of the frame sections with the draft bar, the harrow may freely ride over stones or other similar obstructions without danger of bending the teeth or spikes.

Having thus fully described my invention what I claim as new and desire to secure by Letters Patent is—

A harrow, comprising a draft bar and flexibly connected drag sections, said sections having supporting bars angling forwardly towards the longitudinal center of the harrow, teeth carried by said bars, and the teeth on one side of the longitudinal center being oppositely disposed with reference to those on the other side of the harrow, the teeth on the opposing sides being inwardly, downwardly, and rearwardly inclined.

In testimony whereof I affix my signature.

FRED H. ZUEHLKE.